| United States Patent [19] | [11] | 4,432,650 |
|---|---|---|
| Langen et al. | [45] | Feb. 21, 1984 |

[54] HANDLING DEVICE FOR HANDLING MEAT PORTIONS

[76] Inventors: Johannes C. Langen, 56 Jan van Cuykstraat, NL-5431 GC Cuyk; Christianes P. Langen, 11, Zandkampen, NL-5431 BB Cuyk, both of Netherlands

[21] Appl. No.: 336,365

[22] PCT Filed: May 8, 1981

[86] PCT No.: PCT/NL81/00013
§ 371 Date: Dec. 18, 1981
§ 102(e) Date: Dec. 18, 1981

[87] PCT Pub. No.: WO81/03109
PCT Pub. Date: Nov. 12, 1981

[30] Foreign Application Priority Data
May 9, 1980 [NL] Netherlands .......................... 8002714

[51] Int. Cl.³ .......................... A23B 4/02; B01F 7/16; B01F 15/06
[52] U.S. Cl. ...................................... 366/147; 99/348; 99/486; 99/517; 99/535; 366/197; 366/200; 366/206; 366/601

[58] Field of Search ................. 99/516, 517, 534, 486, 99/535, 536, 348; 426/266, 281, 332, 641, 519; 366/26, 64, 65, 96–98, 144, 200, 147, 201, 185, 366/206, 197, 207, 208, 209, 242, 601, 244–254, 285, 366/286; 62/136

[56] References Cited
U.S. PATENT DOCUMENTS

| 3,156,452 | 11/1964 | Touzalin et al. .................... 366/147 |
| 3,820,597 | 6/1974 | Bittner et al. ........................ 366/147 |
| 3,887,166 | 6/1975 | Van Ginneken .................... 366/168 |
| 3,893,811 | 7/1975 | Good et al. .......................... 366/147 |
| 3,934,860 | 1/1976 | Michels et al. ..................... 366/251 |
| 4,038,426 | 7/1977 | Jesperson et al. .................. 426/266 |
| 4,042,221 | 8/1977 | Myers et al. ........................ 366/207 |
| 4,135,828 | 1/1979 | Cabak ................................. 366/197 |

*Primary Examiner*—Timothy F. Simone
*Attorney, Agent, or Firm*—Diller, Ramik & Wight

[57] ABSTRACT

A device for handling, like massage or mix, meat portions, provided with a wheeled container having a closing lid, for receiving a meat portion and stirring means operative in said container and beared in said lid wherein the inclination of the rotary axis of the stirring means is adjustable and the quantity of meat moved by the stirring means per rotation, is determined, and therefore the rate of massage, said stirring means being provided with at least one conduit for a cooling fluid to retain the meat temperature at a desired level.

11 Claims, 6 Drawing Figures

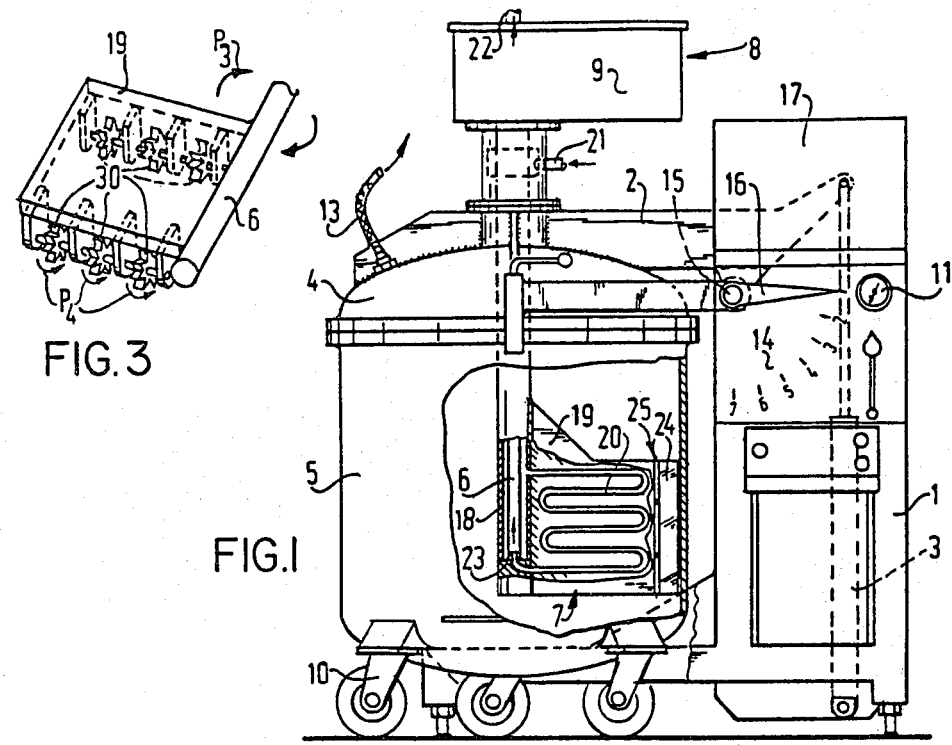
FIG.3
FIG.1
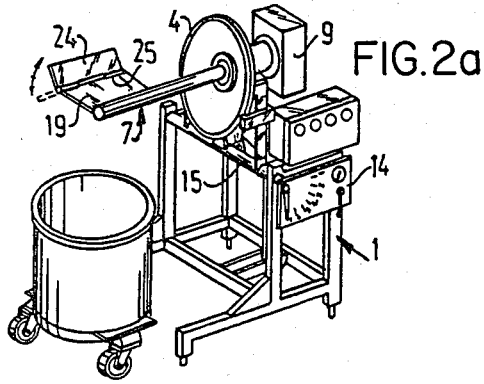
FIG.2a
FIG.2d
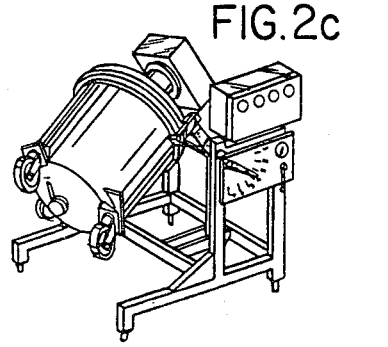
FIG.2c
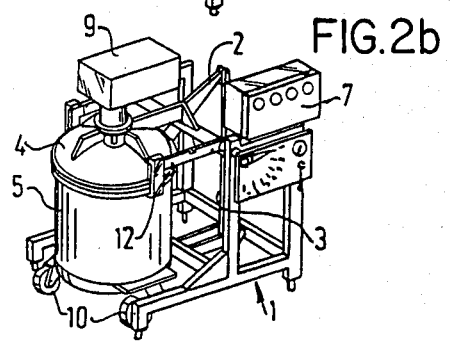
FIG.2b

HANDLING DEVICE FOR HANDLING MEAT PORTIONS

The invention is related to a device for handling, like massage or mix meat portions, provided with a handling container having a closing lid, for receiving a meat portion and stirring means for operation in said container.

The object of the invention is a device of the above indicated type having a simple structure in combination with an effective working with respect to the massage or mix of desired quantities and different kinds of meat.

The invention is distinguished according to the invention by means for adjusting the angularity of the rotating shaft of the stirring means and the vertical.

Owing to the adjustment of the inclination of the rotary axis of the stirring means the quantity of meat moved by the stirring means per rotation, is determined, and therefore the rate of massage is adjustable.

Preferably the adjustment means are controlled with respect to the counter pressure upon the stirring means, such that for the desired massage the stirring means are adjusted automatically in the correct inclination.

To preventing jamming of meat behind the stirring means during discharge of the container the shaft of the stirring means is beared in the closing lid, so when opening the container the stirring means are retracted out of the meat masses, whereas the container may be emptied easily.

To obtain a simple structure for bearing the shaft of the stirring means in said closing lid, in connection with the possibility to vacuum said container, said shaft in combination with said closing lid is beared rockably in a frame. In the preferred embodiment the container is provided with wheels, whilst it is disengageable attached to said lid, whereby the container is adapted to handle and to stock said meat portions as well.

For a maximum stirring action said container is preferably cylindrical, whilst the shaft of the stirring means is coaxially beared in the lid.

The invention is further related to a device of the above described type in which the stirring means are provided with at least one conduit for a cooling fluid. A stirring means as such has the advantage that the temperature of the meat quantity to be handled can be retained at a desired level during or previous to said handling, giving a maximum business conduct. So it is not necessary to bring the container in a freezer after having handled the meat, which is diminishing the costs for such a freezer with respect to the saved space.

Further the stirring means are formed substantially like a section fixed to the rotary shaft, and a section pivotably connected to said fixed section.

The pivotable section will follow precisely the inner wall of the container so preventing a jamming of the meat masses in between the stirring means and said inner wall of the container, and so preventing damage to the meat.

Other features of the invention will be described in the detailed description hereunder In the drawing is:

FIG. 1 an elevated view of the device according to the invention,

FIGS. 2a,b,c,d, a perspective view of the device in different positions,

FIG. 3 a perspective view of an alternative embodiment of the stirring means.

The device disclosed in the drawing is substantially comprising a frame 1, built from sections, supporting a rocking mechanism 2, and a hydraulic cylinder 3 pivotably mounted unto said rocking mechanism 2 and said frame 1.

A closing lid 4 of a container 5 is mounted on said rocking mechanism 2, in said lid the shaft 6 of the stirring means 7 is beared.

The stirring means 7 is attached to said shaft 6 by fastening means not disclosed, for instance bolts.

At the upper side of the lid 4 a drive 8 of the shaft 6 is mounted which drive 8 consists of a electromotor including transmission received in a enclosure 9. The bushing of the shaft 6 in said lid 4 is as such that an airtight bearing is assured.

The container 5 is provided with wheels 10, at least one of which is formed like a castor so that the container is adapted to be located easily by hand between the protruding beams of the frame 1.

The connection between the rim of the lid 4 and the container 5 is also as such that an airtight closure is effected therebetween. Said airtight closure is ameliorated by clamps 12 attached to the locking mechanism 2, by which the rims of the lid and the container may be pressed unto eachother.

The lid 4 is provided with a vacuum connection 13.

At the outer side of the frame 1 a scale 14 is arranged provided with a pointer 16 connected to the rocking axis 15 of the rocking mechanism 2. Above the scale 14 a controlbox including a control device 17 is attached to the frame 1. A power gauge 11 indicates the pressure upon the stirring means.

The stirring means disclosed in the figures are substantially comprising a tube 18, slidably engaging the hollow stirring shaft 6, and on the outer side of which a radially directed blade 19 is welded. In said blade 19 a conduit 20 is received therein in order to conduct a cooling fluid, the upper end of said channel being in communication with a space in between the shaft 6 and the tube 18. Said space is in communication through said bushing in the lid 4 with a connection 21 for the cooling fluid. Further the lower end of the channel 20 is in communication with a channel 22 received in the shaft 6 in order to discharge said cooling fluid.

At the lower side of the shaft 6 and the inner side of the tube 18 a seal 23 is located in order to form a partition between the supply and discharge of the cooling fluid.

The blade 19 is further provided with a pivotable section 24, so swingable through a pivot 25 in parallel relationship to the shaft 6 over a certain angle with respect to a fixed section 19. The outer edge of the pivotable section 24 is permanently in contact with the inner wall of the container 5.

The above described device is working as follows: after having located a certain quantity of meat material in the container 5, said container is wheeled in between the protruding beams of the frame 1, whereas the rocking mechanism 2 is turned by cylinder 3 in an upright position wherein the stirring means being in the position according to FIG. 2a.

Next the lid 5 is placed upon the container 5 by the clamps 12, see FIG. 2b, after the cylinder 3 has lowered the rocking mechanism 2 anti-clockwise. If necessary the space in the container 5 may be subjected to vacuum through the connection 13. Dependent on the counter pressure exercised upon the stirring means the cylinder 3 is powered in such a rate that the container 5 will be positioned in a certain angle with respect to the vertical, see FIG. 2c, with the consequence that the stirring means 7 will stir more or less meat material in the container 5. Said blade 19 and said pivotable section 24 will raise a certain quantity of meat from the meat material with respect to the lowest point in the container 5. The desired inclination can be read upon the scale 14, as well as the work pressure upon the stirring means upon the gauge 11.

FIG. 2d discloses a position of the device, suitable for molding and mixing meat material for sausages, so giving the device a universal function.

During the handling of the meat material the inclination of the container 5 may be adjusted automatically through a device 17 for controlling the cylinder 3, which device 17 is adapted to compare the desired preset pressure upon the stirring means with the actual pressure, what for instance is measurable to the power necessary for the drive of the stirring means.

Owing to the connection of the blade 19 unto a cooling circuit through the inlet 21 and outlet 22 respectively, said blade 19 will be sufficiently cooled off, and by that the meat material to be handled.

FIG. 3 discloses an alternative embodiment of the stirring means. The fixed section of the blades is provided with a plurality of pivotable circular blades 30 along both radially extending sides. The circumference of said circular blades may be provided with teeth, which will penetrate into the meat material. When stirring, what ameliorates the massaging of said meat material. Rotating the blade 19 in the direction of arrow P3, said circular blades 30 will rotate according to arrows P4.

The invention is not limited to the above described embodiment. It is possible that the stirring means are located in a container attached to the frame 1. In this embodiment the inclination of the shaft of the stirring means is adjustable with respect to the container by means of a ball pivot. Further it is possible to incline a shaft of the stirring means supported by the mantel of the container together with said container. The container itself is not limited to the cylindrical form, but can have each desired form, for instance a rectangular cross section.

What is claimed is:

1. A device for processing meat, which comprises a container having a closure lid, stirring means rotatably disposed within said container for massaging or mixing meat portions disposed therewithin, said stirring means including a shaft extending axially within said container, drive means for rotatably driving said shaft and said stirring means, control means for comparing the pressure exerted on said drive means in rotating said stirring means with a desired preset pressure, and means for adjusting the inclination of said shaft in dependence upon said pressure exerted on said drive means in rotating said stirring means to maintain said pressure at said preset pressure.

2. A device according to claim 1, characterized in that said shaft of the stirring means is supported in said lid.

3. A device according to claim 1 or 2 including a frame mounted for movement about a horizontal axis, said shaft and said lid being carried by said frame.

4. A device according to claim 1 or 2, characterized in that said container is provided with wheels and is disengagably attached to said lid.

5. A device according to claim 1 or 2, characterized in that said container is cylindrical and said shaft of the stirring means is coaxially supported in said lid.

6. A device according to claim 2 including a frame mounted for movement about a horizontal axis, said shaft and said lid being carried by said frame.

7. A device according to claim 2, characterized in that said container is provided with wheels and is disengagably attached to said lid.

8. A device according to claim 3, characterized in that said container is provided with wheels and is disengagably attached to said lid.

9. A device according to claim 2, characterized in that said container is cylindrical and said shaft of the stirring means is supported by said lid coaxially within said container.

10. A device according to claim 3, characterized in that said container is cylindrical and said shaft of the stirring means is supported by said lid coaxially within said container.

11. A device according to claim 4, characterized in that said container is cylindrical and said shaft of the stirring means is supported by said lid coaxially within said container.

* * * * *